Feb. 26, 1957 G. L. DIMMICK ET AL 2,782,685
OPTICAL DEVICE PROVIDING A LIGHT DEFINING APERTURE
Original Filed April 22, 1947
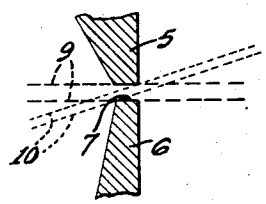
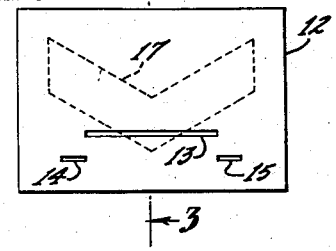
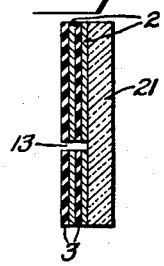
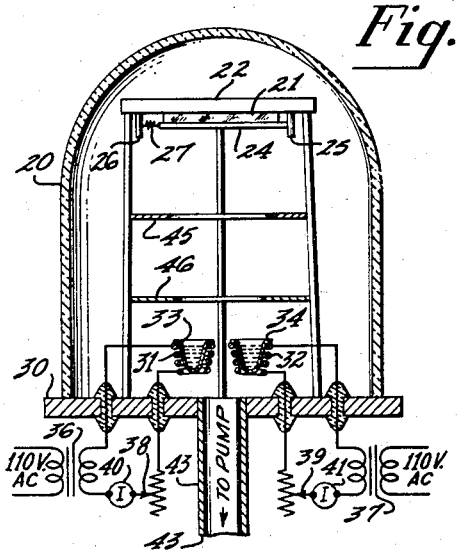
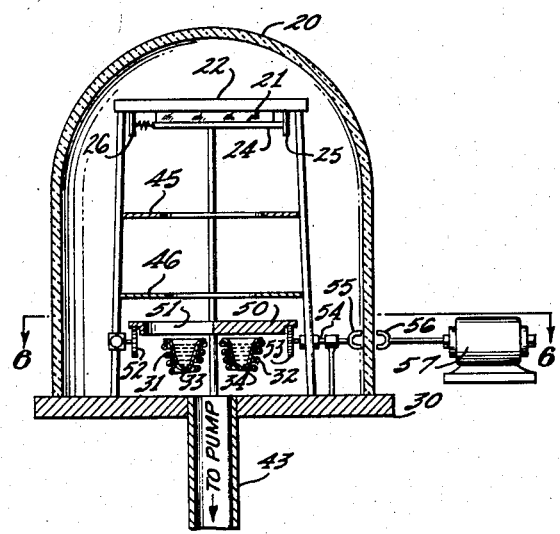
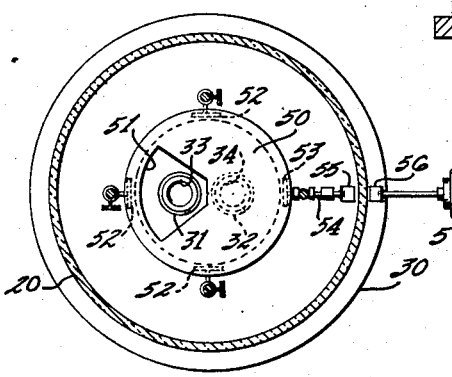
INVENTORS
Glenn L. Dimmick &
Mary E. Widdop
BY Conder C. Henry
ATTORNEY United States Patent Office 2,782,685
Patented Feb. 26, 1957

2,782,685

OPTICAL DEVICE PROVIDING A LIGHT DEFINING APERTURE

Glenn L. Dimmick, Haddon Heights, and Mary E. Widdop, Oaklyn, N. J., assignors to Radio Corporation of America, a corporation of Delaware Original application April 22, 1947, Serial No. 743,222, now Patent No. 2,633,427, dated March 31, 1953. Divided and this application November 2, 1951, Serial No. 254,496

5 Claims. (Cl. 88—61)

Our invention relates to an article of manufacture in the nature of a light defining optical element used in sound recording or sound reproducing systems, and particularly to such an element having a light defining slit therein formed by simultaneously or alternately evaporating a metal and an insulator in vacuo and causing the same to be deposited as a thin film or coating in substantially equal proportions on a predetermined portion of a glass plate across and against which a fine wire of uniform diameter has been stretched, and then removing the wire after the film is formed to expose an uncoated portion of the glass to form the slit.

In the recording and reproducing of sound from photographic records thereof, a light beam is defined or shaped usually by two elements, one being an aperture having various predetermined shapes depending on the type of sound record to be recorded, and the other element being a narrow slit which defines the width of the light beam passing to the film. Inasmuch as the definition of the edges of the light beam reaching the film is one of the factors determining the quality of the sound record, it is particularly important that the light defining slit have the proper qualities to provide good definition. Two of these qualities are that the slit must be thin to provide an equal width light beam regardless of the angle of incidence of the light on the slit, and that the edges of the slit be straight and uniform and easy to keep clean.

Mechanical slits have been used, but these have been found to be expensive and difficult to make because of the extreme accuracy and the large amount of hand work and testing required to produce them. Even when produced with the greatest care, they still have many objectionable characteristics. Among such characteristics are: the difficulty in keeping the slits clean without injury when thin enough to provide a constant width beam; the difficulty in making two slits exactly alike; the difficulty in keeping the surface of the slit edges parallel, and the difficulty in keeping them smooth and free from irregularities. Where the slits are more complicated, that is, the slit plate or mask has more than one slit therein, it becomes extremely difficult and expensive to produce mechanical slits.

Other methods have been tried for producing light slits on the order of .0018 of an inch in width, such as by photo-etching thin metal sheets. Such methods have not proved satisfactory for high quality sound recording purposes.

Also, attempts have been made to produce light slits by coating one surface of a circular plate of plain glass with chemically deposited silver, the slit then being made by scraping the silver off of the glass in a narrow rectangular area through which light was transmitted. A cover glass was then cemented over the silvered surface. When a sharp tool was used, the slits thus made were satisfactory except that the silver reflected so much light that "ghost" images were produced due to the light being reflected back and forth between the glass surfaces and the silver surface. This objection precluded the use of such chemically deposited slits.

Attempts have been made to overcome this difficulty by applying a coating of black "Bakelite" non-reflecting paint to the glass, the paint being scraped off with a sharp tool to form the slits. However, the slits were still unsatisfactory because the paint had considerable thickness and the edges tore when the tool passed through it. Thus, the slit edges were not sharply defined which caused sound distortion. Also, because of the thickness of the paint, the grooves collected dirt and were difficult to keep clean.

Our invention overcomes all of the foregoing objections. Specifically, an object of our invention is to produce an optical element of the kind referred to wherein the thickness of the opaque portions surrounding the slit opening is relatively small as compared to the narrow dimension of the slit.

It is also our aim to provide such an element wherein the area surrounding the slit opening would be very opaque to transmitted light and would have very low surface reflection.

Further, it is our purpose to provide such an element wherein the opaque material surrounding the slit opening would be hard and would be unaffected by either moisture, temperature, or age.

Other and important objects of our invention are to produce such elements wherein each slit opening would be very accurate in dimension and have accurately parallel sides and sharp lines of demarcation between the transparent and opaque portions, and wherein all slits would be practically identical for size and light transmission properties.

For a more complete understanding of our invention, reference is made to the accompanying drawings in which—

Fig. 1 is a fragmentary view in vertical cross-section of a prior type of optical device having a mechanical light slit formed therein.

Fig. 2 is a front elevational view of an improved light mask in accordance with our present invention.

Fig. 3 is an enlarged vertical sectional view taken along the line 3—3 of Fig. 2.

Fig. 4 is a cross-sectional view of a system for manufacturing the optical device having a light slit formed therein as embodied in our invention.

Fig. 5 is a cross-sectional view of a modification of the system of Fig. 4.

Fig. 6 is a transverse cross-sectional view taken along the line 6—6 of Fig. 5.

Referring more particularly to the drawings, jaws 5 and 6 are those of a mechanical light slit of the type mentioned above, it being observed that, due to the width of the jaws, the light beam being transmitted perpendicular to slit 7, such as shown by limiting rays 9, is wider than a beam of light at an angle to the light slit, such as shown by limiting rays 10. Since, for purposes of cleaning, the slit jaws 5 and 6 must have appreciable thickness to prevent damage thereto, they have the disadvantage of providing a slit which varies in effective width according to the angle of incident light rays thereon.

In Fig. 2, an improved light mask having a coating 12 formed therein in accordance with our invention is shown, the said mask having a long slit 13 therein and two shorter slits 14 and 15 displaced therefrom and on which has been superimposed a light beam image shown by the dotted lines 17 to illustrate one method of sound recording. That is, the beam of light 17 is vibrated vertically by a light modulator, the slit 13 passing different lengths of the light beam dependent upon the position of the beam image 17 on the mask.

In Fig. 3 one embodiment of the invention is illustrated as a glass plate 21 coated with a plurality of alternate metal layers 2 and insulating layers 3 and containing a slit 13.

As mentioned above, the slit is formed by evaporating material onto the surface of a glass plate across which is placed a very uniform and fine steel wire, the material being deposited over the glass surface except where prevented by the wire. When the wire is removed, a light transmitting aperture having sharp parallel edges is provided in the material on the glass.

Referring now to Figs. 4 and 5, which illustrate suitable film depositing apparatus, the deposition is accomplished by the use of a bell jar 20 in which is mounted a piece of glass 21 against a metal plate 22. A fine steel wire 24 has one end mounted at 25 and the other end mounted at 26, a spring 27 being employed to maintain the wire straight and in firm contact with the glass plate 21. The bell jar 20 is mounted on a base 30 through which pass electrical conductors to heating coils 31 and 32 of molybdenum wire which heat molybdenum boats 33 and 34, respectively, the wire being connected to, but insulated from the boats with aluminum oxide cement.

The external circuits for the boats are through respective transformers 36 and 37 having variable resistors 38 and 39 and ammeters 40 and 41, respectively. The transformers 36 and 37 are connected to any standard 60 cycle 110 volt source. The bell jar 20 is evacuated by connection to a vacuum pump through a pipe 43. Since the vacuum is not perfect, about .2 of a micron being used in practice, there is a small percentage of the evaporated molecules which strike the air molecules and get deflected so that some of the material could be deposited on the glass within the area defined by the wire. However, by use of a pair of baffles 45 and 46 having openings of restricted size and graduated in both length and width therein, this diffusion is prevented by permitting only the directly transmitted evaporated particles to reach the glass, and thus a slit of the width defined by the diameter of the wire results.

In determining the type of material and the method of using the above described apparatus, many pure metals were used, such as copper, silver, aluminum, gold, lead, cadmium and zinc. It was found that these metals all reflected too much light. Also, an attempt was made to find an inorganic compound which would evaporate easily, be black and light absorbing, have a high transmission density in layers a few wave lengths thick, and be relatively hard and insoluble in water. No such material was found. Carbon was discarded because the carbon evaporates very slowly and the resulting film is quite soft.

Since no single material appeared satisfactory, the use of a combination of materials was conceived, such as a material of low electrical resistance and a material of high electrical resistance; i. e., a metal and an insulator, in the correct proportion, and it was discovered that a combination of copper and manganese fluoride in substantially equal proportions provided the best result. The optical properties of metal are directly related to their electrical properties. This is shown by the equation:

$$R = 1 - 0.365\sqrt{\frac{r}{\lambda}}$$

Where R is the reflectivity of the metal, $r$ is the specific resistance of the metal in ohms and $\lambda$ is the wave length of radiant energy in microns. This equation is very accurate for wave lengths over 12 microns while the following equation holds for wave lengths between 5 microns and 12 microns:

$$R = 1 - \left(0.365\sqrt{\frac{r}{\lambda}} - 0.0667\frac{r}{\lambda}\right)$$

These equations show that the reflectivity decreases as the resistivity increases, that is, when the metallic reflectivity decreases to zero the resistivity is infinite. Now, when a metal and insulator are simultaneously evaporated, the molecules of metals in the resulting film are separated by the molecules of the insulator material. This lowers the conductivity to nearly zero and reflectivity is correspondingly reduced.

Also, it was discovered that the copper and the manganese fluoride should be evaporated in approximately equal proportions, although the proportions were not particularly critical. If the proportion of insulator is too great, the opacity of the resulting film is not as great as is desirable, while if the proportion of metal is too great, the film will be partially conducting and, therefore, would reflect a portion of the light.

Thus, in Fig. 4, one of the boats contains copper and the other manganese fluoride, and these are simultaneously evaporated and deposited on the glass plate 21. In carrying out this process, it was discovered that even though the glass were cleaned with great care, pin holes would appear in the opaque portion of the slit which were caused by small particles adhering to the glass after it had been cleaned, thus preventing the evaporated material from reaching the glass. When these particles were removed by cleaning, a clear area would result. This difficulty was overcome by a double evaporation technique as follows:

First, a fairly dense film of copper and manganese fluoride was evaporated and then the bell jar was opened. The surface of the film was then brushed with a soft brush to remove the particles to new locations. The jar was then evacuated again and another film layer of copper and manganese fluoride was deposited over the first. This method completely eliminated the pin holes.

To produce a film which was black on both surfaces by reflection, it was found unnecessary to keep both the metal and the insulator evaporating continuously. That is, in the first step both the metal and the insulator were evaporated simultaneously at about the same rate for a few minutes. The second step was to turn off the insulator boat and leave the metal evaporating. Now, when the film was opaque, the last step was to turn on the insulator boat and have the two boats operate simultaneously for a few minutes. This procedure resulted in a film having a pure metal core with surface layers made up of a combination of metal and insulator, the surfaces thereof being black. This procedure took less pure metal to obtain the necessary opacity than if the combination of metal and insulator were used for the complete film.

Furthermore, the double evaporating technique to eliminate pin holes could be used to advantage in this later method. For instance, the two boats are used for the first few minutes and then the boat containing the insulator is turned off, the boat containing the metal is then continued until the film is nearly opaque. The bell jar is then opened and the film surface is brushed, this outer surface being a bright copper color at this stage. The jar is then again evacuated and the metal boat is turned on, and after the desired opacity has been obtained the boat containing the insulator is turned on and the simultaneous evaporation is continued for a few minutes until the outer surface is as black as desired. To illustrate the relative thickness of each of the four layers of the superposed coatings it was found that the following time schedule gave satisfactory results:

1st composite coating (simultaneous evaporation of metal and insulator)—3 minutes.
1st coating of metal alone—7 minutes.
2nd coating of metal alone—7 minutes.
2nd composite coating (simultaneous evaporation of metal and insulator)—3 minutes.

Since the composite coatings were formed by simultaneous evaporation of two substances at about equal rates and since voltage and current were maintained constant for all coatings, it can be seen that the thickness of each of the four coatings was about the same. Since the actual voltage and current used would depend upon many variable factors such as construction of the heating units, size of the apparatus, length of evaporation path, etc., the listing of the actual figures would be of little significance. By visual observation of opacity and color by reflected light, the operator can easily determine when enough material has been deposited.

Another modification of the above described evaporating technique may also be used with apparatus such as illustrated in Figs. 5 and 6. In the first and last steps of the evaporating procedure, instead of evaporating the metal and insulator simultaneously, they may be evaporated alternately and deposited as a plurality of extremely thin layers each of the order of a single molecule in thickness. Referring to Figs. 5 and 6, a rotatable shutter 50 is conveniently positioned above the mouths of crucibles 33 and 34. This shutter may be a masking plate having an open segment 51 which may be about one-fourth the entire area of the shutter 50. The shutter is supported on idler rollers 52 and is driven by means of a driving roller 53 connected through a drive-shaft 54 to a magnet 55. A similar magnet 56 is placed outside the vacuum chamber 20 with its poles adjacent the poles of magnet 55. The magnet 56 is connected to the rotor shaft of a variable speed motor 57 which may have appropriate reduction gearing. Rotation of the rotor shaft of motor 57 at a slow rate of speed rotates its associated magnet 56 and also causes corresponding rotation of the magnet 55 within the vacuum chamber. Rotation of the magnet 55 with its shaft results in the rotation of the shuter 50.

When the open segment 51 of shutter 50 is positioned over one of the crucibles 33 or 34, the evaporating material from that crucible passes through to strike the plate 21 while that from the other crucible is prevented from depositing thereon. The shutter is rotated slowly, allowing evaporated material from, first, one crucible and then the other to be deposited but not material from both simultaneously. The shutter is preferably rotated at a speed such that each crucible is unmasked for only a few seconds at a time, say 2 to 4 seconds, since that is sufficient time to deposit a monomolecular layer at conveniently low voltages. For each particular material, voltage, distance, etc., the preferred time may be easily estimated. Instead of using a motor to rotate the shaft to which magnet 56 is attached, it may, of course, be rotated by hand.

Using the alternating method of Figs. 5 and 6 the same effect is obtained as when evaporating both materials simultaneously. The remainder of the process including the intermediate steps of evaporating a single or double layer of metal, alone, and the brushing of the coating to eliminate pin holes is similar to that previously described in connection with simultaneous evaporation, and the relative evaporation times given in the previous example may be used. It may be noted that the thickness of each of the intermediate layers of copper, when such are used, is of the order of 100 times as thick as that of any of the extremely thin monomolecular layers deposited in the alternating method and the factor is, of course, 200 if a double layer of copper is deposited before depositing the final light-absorbing coatings. These figures are given only as approximations, however, and considerable variation is possible without departing from the spirit of the invention.

After the evaporated slits are completed by either method as just described, they are baked at 100° C. for several hours to stabilize the film. A thin cover glass is then cemented over the film to protect it against deep scratches or abrasions, using either Canada balsam or a thermosetting cement. After the slit is thus completed, it may be spun into a metal mounting for use in a sound recording or reproducing optical system.

It is to be noted that certain other combinations may be used to produce evaporated slits such as silver, gold, copper, aluminum and lead in combinations with zinc sulphide, manganese fluoride, thorium oxi-fluoride and magnesium fluoride. As mentioned above, however, the preferred combination is copper and manganese fluoride. The films made with copper and magnesium fluoride are very black but were affected by moisture and temperature. Copper and zinc produced fairly durable films but they were not sufficiently black. Copper and thorium oxi-fluoride made a hard black film but, when heated, the metal and the insulator appeared to separate and the film became highly reflective. It was found that silver would not evaporate properly since it diffused all through the bell jar. Gold was found to be satisfactory but not economical by comparison. Lead was found to be too soft, while it was necessary to evaporate aluminum from a tungsten coil which made control of the rate of evaporation very difficult.

Having thus described our invention and, in accordance with the statute relating to such matters, having also described the method of making the same—which method is claimed in our copending application Serial No. 743,222, filed April 22, 1947, now U. S. Patent No. 2,633,427, of which this present application is a division—what we claim as new and desire to secure by Letters Patent is as follows:

1. An article of manufacture comprising a transparent base plate having a substantially nonreflective opaque coating thereon, said coating having an opening therein for transmitting light, said coating being composed of a combination of copper and manganese fluoride.

2. An optical device comprising a transparent base plate on which is a substantially nonreflective opaque coating having a light defining aperture therein, said coating being composed of at least two films each consisting of copper and manganese fluoride.

3. An optical device comprising a transparent base plate on which is a substantially nonreflective opaque film having a light defining aperture therein, the said film consisting of a copper core on both sides of which are surface layers consisting of copper and manganese fluoride.

4. An apertured optical device comprising a transparent base plate having a nonreflective opaque coating thereon, said coating being provided with a narrow sharp edged slit therein for precisely defining a uniformly narrow beam of transmitted light, said coating comprising a plurality of optically thin layers, each said layer comprising an intermixture of a metal and an inorganic insulator.

5. A device in accordance with claim 4 in which said coating includes an intermediate metal layer of a thickness substantially greater than that of any of the other layers.

References Cited in the file of this patent

UNITED STATES PATENTS

| | | |
|---|---|---|
| 2,247,805 | Faus | July 1, 1941 |
| 2,373,639 | Turner | Apr. 10, 1945 |
| 2,394,533 | Colbert | Feb. 12, 1946 |
| 2,399,799 | Guellich | May 7, 1946 |
| 2,415,226 | Sziklai | Feb. 4, 1947 |
| 2,447,836 | Beeber et al. | Aug. 24, 1948 |
| 2,547,271 | Soto | Apr. 3, 1951 |
| 2,600,579 | Ruedy et al. | June 17, 1952 |